United States Patent [19]

Neale, Sr.

[11] 4,287,581
[45] Sep. 1, 1981

[54] ULTRASONIC FLUID LEAK DETECTOR

[76] Inventor: Dory J. Neale, Sr., 3710 Shore Acres Blvd., St. Petersburg, Fla. 33703

[21] Appl. No.: 122,584

[22] Filed: Feb. 19, 1980

[51] Int. Cl.³ .............................................. G01M 3/24
[52] U.S. Cl. ................................. 367/135; 73/40.5 A; 367/910; 340/605
[58] Field of Search ........................ 367/135, 136, 910; 73/40.5 A; 340/605

[56] References Cited

U.S. PATENT DOCUMENTS

| | | | |
|---|---|---|---|
| 2,008,934 | 7/1935 | Smith | 73/40.5 A |
| 2,884,624 | 4/1959 | Dean et al. | 340/605 |
| 2,940,302 | 6/1960 | Scherbatskoy | 73/40.5 R |
| 3,028,450 | 4/1962 | Manning | 73/40.5 A X |
| 3,168,824 | 2/1965 | Florer et al. | 73/40.5 A |
| 3,170,152 | 2/1965 | Long | 340/605 X |
| 3,192,516 | 6/1965 | Simpkins et al. | 340/605 |
| 3,253,457 | 5/1966 | Pakala et al. | 367/910 X |
| 3,462,240 | 8/1969 | Bosselaar et al. | 73/40.5 A |
| 3,500,070 | 3/1970 | Palmer | 73/40.5 A |
| 3,561,256 | 2/1971 | Bustin et al. | 73/40.5 A |
| 3,575,040 | 4/1971 | Bosselaar | 73/40.5 A |
| 3,814,207 | 6/1974 | Kusuda et al. | 73/40.5 A X |
| 3,838,593 | 10/1974 | Thompson | 73/40.5 A |
| 3,930,556 | 1/1976 | Kusuda et al. | 73/40.5 A X |
| 4,083,229 | 4/1978 | Anway | 73/40.5 A |

Primary Examiner—Richard A. Farley
Attorney, Agent, or Firm—Fishburn, Gold & Litman

[57] ABSTRACT

A device for detecting ultrasonic noise, particularly such noise as generated by fluid leaks, includes a directional ultrasonic microphone, amplifiers and ultrasonic filters, an envelope detector, an audio preamplifier and filter, a level control, a meter, an audio power amplifier and speaker, and a phase shift feedback network connected from the output of the power amplifier to an input thereof. A switch is operable in a first setting to connect the power amplifier to the level control to convey the audio frequency amplitude envelope of the detected ultrasonic noise through the speaker or in a second setting to connect the power amplifier to the feedback network. A level detector is operatively connected to the level control and provides a control signal which is conducted to the feedback network. When the control signal exceeds a selected level, the feedback loop circuit is completed, whereby the power amplifier oscillates audibly through the speaker and gives audible indication of an ultrasonic noise. The components are enclosed in a pistol shaped housing for substantially single handed aiming and operation.

14 Claims, 4 Drawing Figures

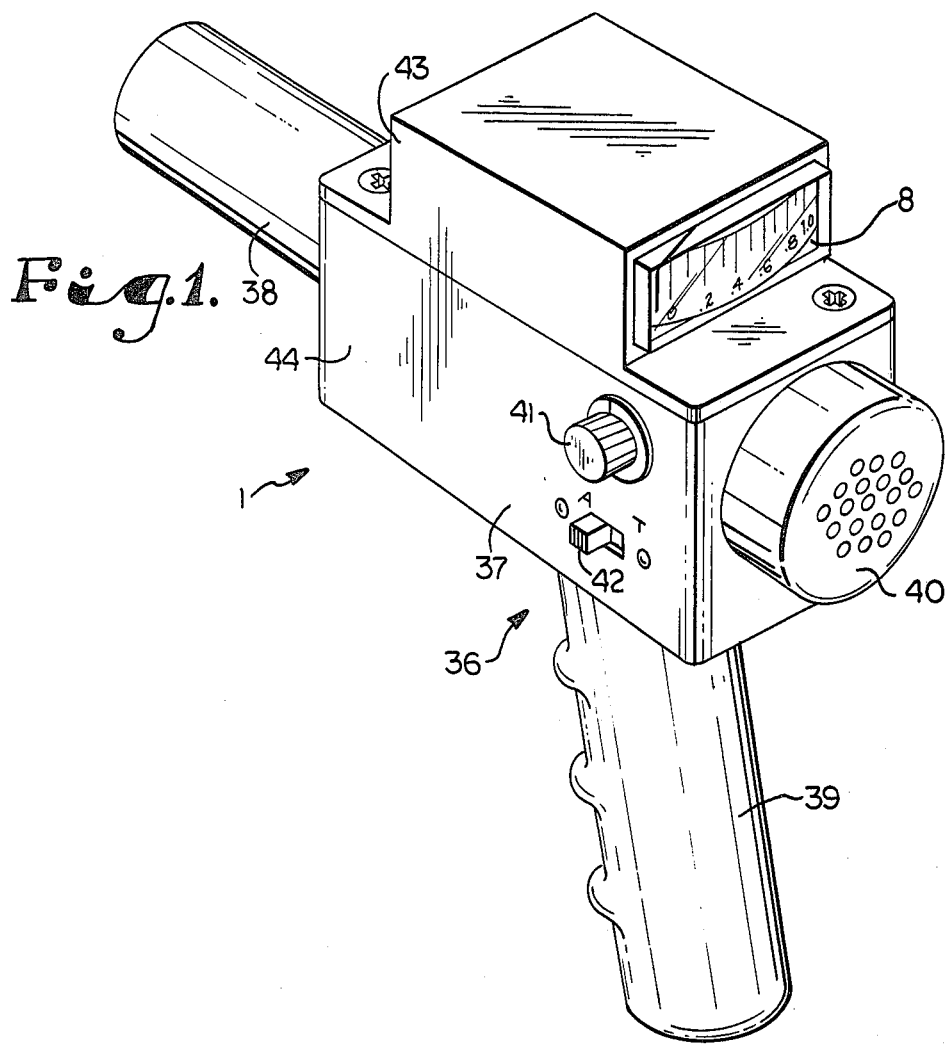
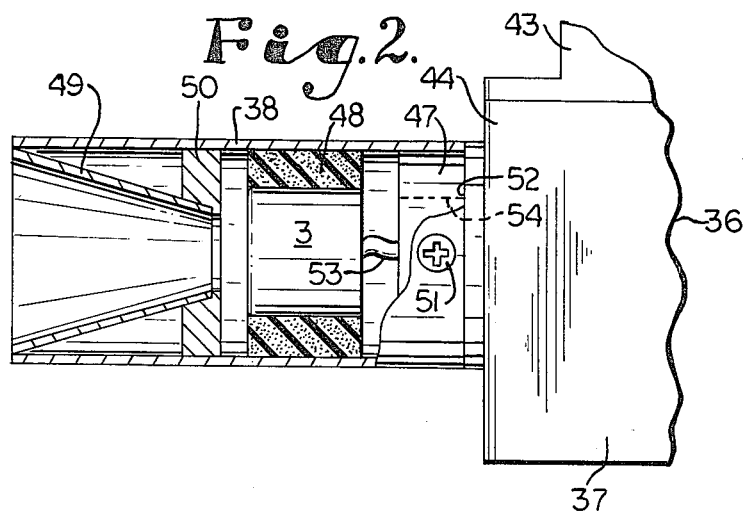

4,287,581

ULTRASONIC FLUID LEAK DETECTOR

FIELD OF THE INVENTION

The present invention relates to ultrasonic noise detectors and more particularly to such a detector including an alarm which is triggered upon the detection of ultrasonic noise.

BACKGROUND OF THE INVENTION

Problems associated with various types of equipment are often characterized by the generation of noise, including components thereof which are in the ultrasonic range of frequencies. Such problems include corona discharges, worn bearings and valves, high pressure fluid leaks, and the like. While it is often possible to find and diagnose such problems from the noise made thereby which falls in the human audible frequency range, such location and diagnosis of the problem is difficult when the equipment is in an already noisy environment. Thus, apparatus have been developed and employed which are sensitive to ultrasonic frequency sound for use in such noisy environments.

The ultrasonic detectors employed include generally a microphone sensitive to ultrasonic frequencies, a high pass filter to reject audible frequency sound, and means to indicate the detection of ultrasonic noise. Such means may include a heterodyne arrangement, wherein a local oscillator signal is combined with the received ultrasonic signal to convert same to an audible frequency or an envelope detector or A.M. (amplitude modulation) type of detector to detect the variations in the amplitude of the ultrasonic signal. The detectors may further include a signal strength meter, audio amplifiers and filters, a power amplifier, and a speaker.

In the telephone industry, communication cables are often pressurized with an inert gas to preclude the entrance of moisture which could erode the electrical isolation between the various conductors of the cable. When a gas leak occurs in such a cable, the use of ultrasonic detectors to find the leak is often laborious and time consuming because of the highly directional nature of sound of ultrasonic frequencies and because of the low intensity of ultrasonic sound from the relatively low pressure gas leak.

SUMMARY AND OBJECTS OF THE INVENTION

The ultrasonic fluid leak detector of the present invention overcomes the above described difficulties by providing an alarm which is triggered upon the detection of ultrasonic noise exceeding a selected level. Thus, the cable may be quickly scanned with the detector in an alarm mode thereof until the alarm is triggered. Then, switching to an audio mode of the detector, the cable may be more carefully scanned to determine the precise location of the leak.

The principal objects of the present invention are: to provide an improved device for detecting ultrasonic noise generated by fluid leaks, faulty machine parts, corona discharge, and the like; to provide such a device which is particularly adapted for detecting leaks from gas filled communication transmission cables; to provide such a device including circuitry to provide an audible reproduction of the amplitude envelope of the ultrasonic noise detected; to provide such a device including an alarm arrangement which is triggered upon the detection of ultrasonic noise exceeding a selected intensity; to provide such a device which is housed in a substantially pistol shaped case and which includes a directional microphone for substantially one handed aiming and operation; to provide such a device which is battery powered and wherein the circuitry includes low power consumption components to maximize the useful operating life of the batteries; and to provide such an ultrasonic fluid leak detector which is economical to manufacture, positive and efficient in operation, capable of long operating life, and particularly well adapted for its intended purpose.

Other objects and advantages of this invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the ultrasonic fluid leak detector.

BRIEF DESCRIPTION OF THE DRAWINGS

FIG. 1 is a perspective view of the ultrasonic fluid leak detector embodying the present invention.

FIG. 2 is an enlarged longitudinal sectional view of a directional enclosure for the ultrasonic microphone.

Figure 3:
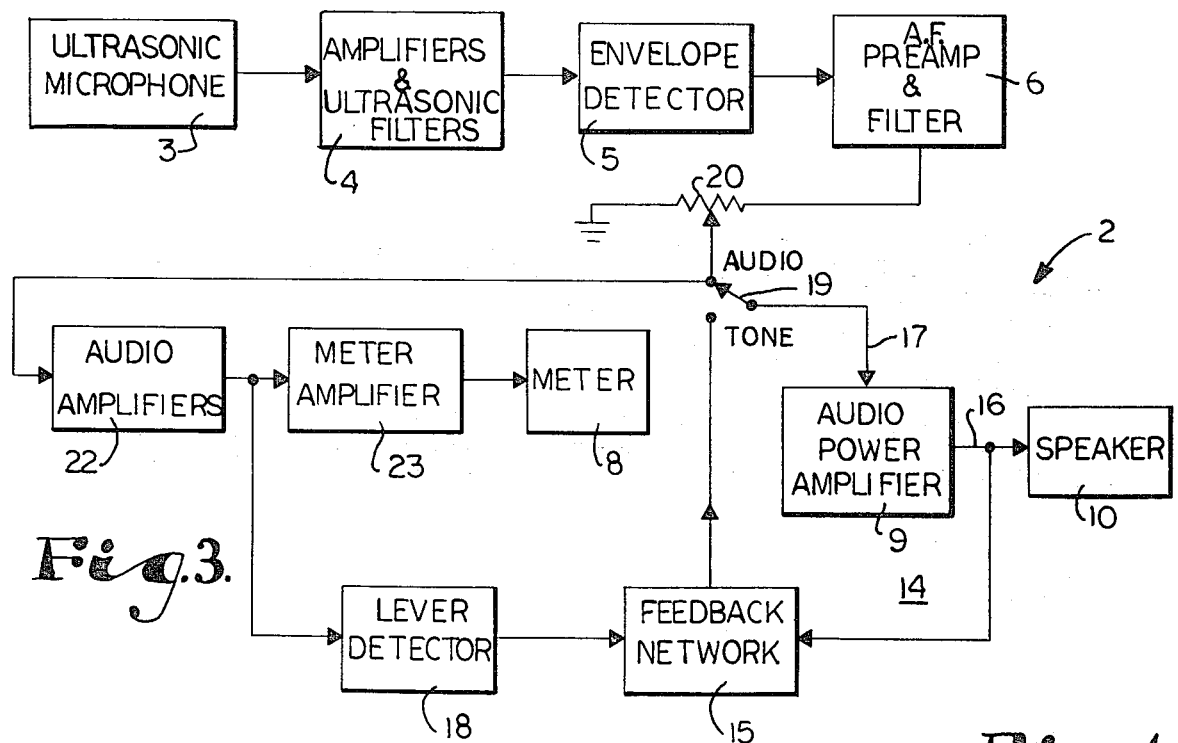
FIG. 3 is a block diagram of the circuitry of the ultrasonic fluid leak detector.
Figure 4:
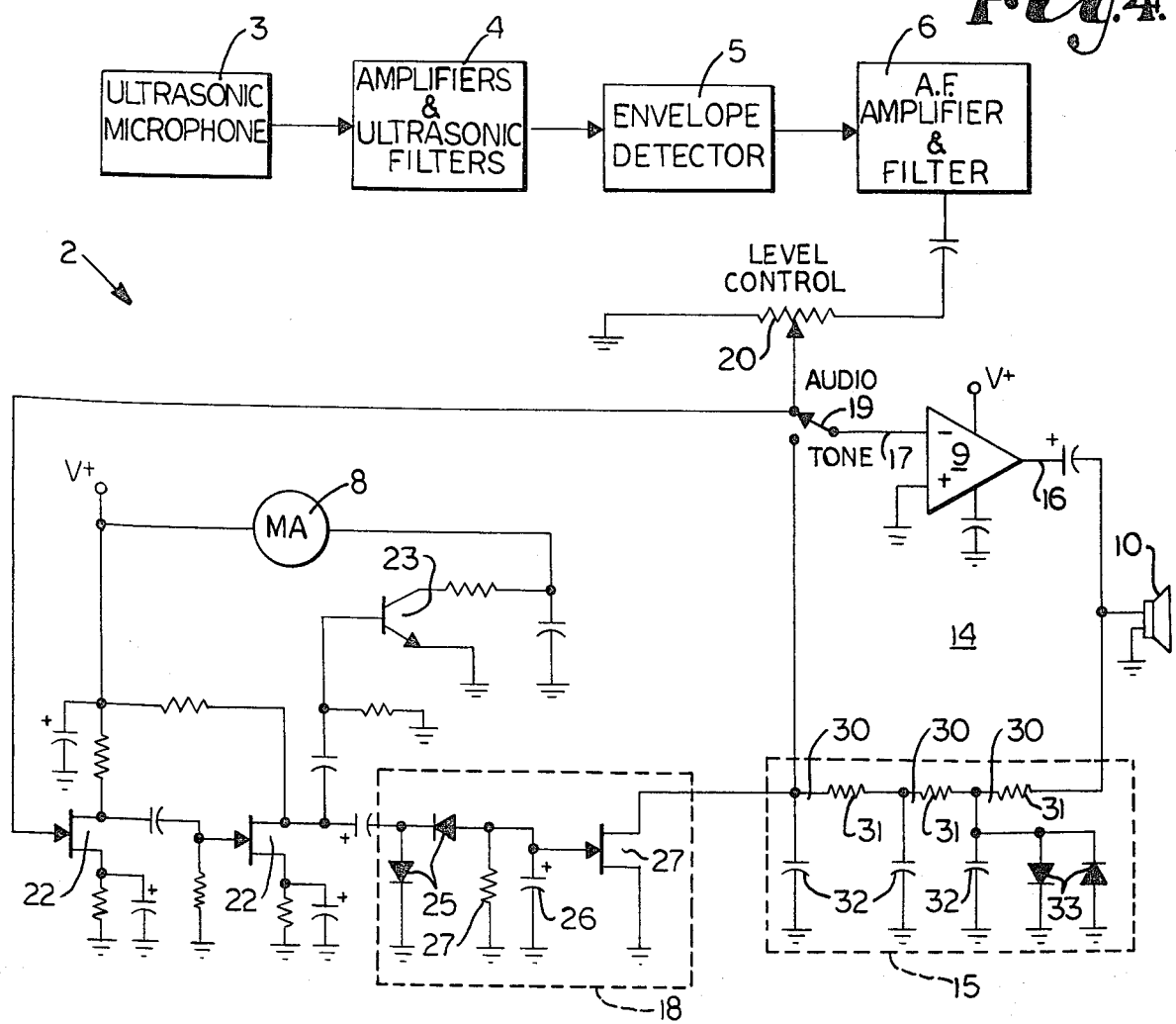
FIG. 4 is a schematic diagram illustrating in detail the circuitry of the ultrasonic fluid leak detector.

As required, detailed embodiments of the present invention are enclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

DETAILED DESCRIPTION OF THE PREFERRED EMBODIMENTS

Referring to the drawings in more detail:

The reference numeral 1, FIG. 1, generally designates an ultrasonic fluid leak detector embodying the present invention. With reference to FIG. 3, the circuitry 2 of the detector 1 includes: an ultrasonic microphone 3, several stages of amplifiers and ultrasonic filters 4, an envelope detector 5, an audio frequency preamplifier and filter 6, altogether providing an amplified audio frequency envelope signal having the time varying amplitude characteristics of the ultrasonic noise which has been detected. The envelope signal is further amplified and supplied to a milliammeter 8 to give a visual indication of the detection of ultrasonic noise and to an audio power amplifier 9 and speaker 10 to give an audible reproduction thereof. The detector 1 is provided with an alarm arrangement 14 which is operable to be triggered upon the detection of ultrasonic noise. In the preferred embodiment of the present invention, the alarm arrangement 14 includes a feedback network 15 connected between an output 16 of the power amplifier 9 and an input 17 thereof. A level detector 18 provides a control signal proportional in level to the envelope signal from the preamplifier 6 and causes the alarm arrangement 14 to go into oscillation when the envelope signal exceeds a selected level. A switch 19 is operable to connect the input 17 of the power amplifier 9 either to a level control 20 to receive the envelope signal or to the feedback network 15 for operation in an alarm mode.

The amplifiers and ultrasonic filters 4 preferably include a plurality of active filter stages with the filters having a frequency response centered at about 40 kilohertz. The filters preferably include low pass sections to reject frequencies greater than 40 kilohertz and high pass sections to reject frequencies lower than 40 kilohertz. The envelope detector 5 is an A.M. (amplitude modulation) detector and is operative to detect the variation in amplitude of the ultrasonic noise picked up by the microphone 3. The filter associated with the audio amplifier 6 is preferably a low pass filter having a response below 3 kilohertz. The detector 1 is therefore sensitive to ultrasonic noises or sounds having an amplitude variation below 3 kilohertz. The audio frequency signal provided by the amplifier 6 has an instantaneous amplitude proportional to the instantaneous amplitude of the ultrasonic noise detected. The level control 20 functions as a volume control for the power amplifier 9 and speaker 10 and, further, acts as a sensitivity control to adjust the level of the envelope signal to which the alarm arrangement 14 is triggered. The circuit 2 includes further audio amplifiers 22 to increase the level of the envelope signal derived from the preamplifier 6 for application to the meter 8 and level detector 18. The meter 8 includes a meter current amplifier 23 to provide current to drive the meter 8. The meter 8 visually indicates the relative level of the envelope signal and may be calibrated in any convenient units such as relative intensity units or decibels.

The level detector 18 provides a D.C. control signal to the feedback loop or alarm arrangement 14. A pair of diodes 25 rectifies a signal proportional to the envelope signal and stores a voltage level thereto on a capacitor 26 in combination with a resistor 27 connected in parallel therewith. The level detector transistor 28 makes the voltage level stored on the capacitor 26 available to the alarm feedback loop 14 as a control signal.

In the illustrated circuit 2, the alarm arrangement 14 is a phase shift oscillator. The power amplifier 9 is illustrated as an operational amplifier, and the input 17 thereof is an inverting input. Therefore, the output signal therefrom is shifted 180° by the network 15 for feedback to the input 17 of the amplifier 9 in phase. The feedback network 15 includes three identical low pass filter type sections 30, each including a series resistor 31 and a shunt capacitor 32. In alternative embodiments of the detector 1, the filter section 30 could be high pass sections and, further, the alarm arrangement 14 could be some other type of oscillator besides a phase shift oscillator. The filter sections 30 determine the frequency of oscillation of the alarm arrangement 14. The frequency of oscillation is the frequency at which the phase shift is exactly 180° and, in the illustrated embodiment, is a high pitched audio frequency for ease of hearing by the human ear in otherwise noisy environments. Preferably, the feedback network 15 includes a shunt connected antiparallel, or back-to-back, pair of diodes 33 to limit the amplitude of the feedback signal so that same is essentially sinusoidal and low in harmonic content.

The circuit 2 is mounted in a substantially pistol shaped case 36, FIG. 1, for convenient one handed aiming. The case 36 includes a main body section 37 enclosing the components of the circuit 2 and batteries (not shown) for powering same. A directional microphone enclosure 38 is mounted on the front of the main body 37, and a handle 39 extends from a lower surface thereof. A speaker enclosure 40 is mounted on the rear of the main body 37 and provides protection for the speaker 10. A rotatable knob 41 to operate the level control 20 and an operator 42 for the switch 36 are provided externally on the main body 37. The switch positions may be identified in a manner such as illustrated with the "A" position signifying an audio position to amplify the audio frequency envelope signal and a "T" signifying a tone position wherein a tone is heard when the alarm arrangement 14 is triggered. The main body 37 may be constructed in two parts 43 and 44 to provide for access to install and remove batteries as needed.

In the illustrated example, the ultrasonic microphone 3 is mounted within a directional enclosure 38. The exemplary enclosure 38 is substantially cylindrical and tubular and has a projection 47 extending from the main body section 37 to receive the tubular enclosure 38 thereon. The microphone element 3 is mounted in the tube 38 and is provided with acoustic insulation and shock protection by a mounting such as a ring of foam rubber 48 or the like. A conical sound director 49 directs incoming sound to the microphone 3 and a spacer 50 provides a mount for the director 49. The conical angle of the director 49 determines, to a considerable degree, the directionality of the enclosure 38 although the microphone element 3 has some directional characteristics. The enclosure 38 is mounted to the projection 47 by gluing, fasteners or the like, such as a screw 51 received through the tube 38 and the projection 47. A shoulder 52 on the projection 47 correctly positions the tube 38 thereon. A microphone cable 53 extends from the microphone element 3 and through an aperture 54 formed through the projection 47 to the circuit 2 within the case 36.

In use, the ultrasonic fluid leak detector 1 is provided with fresh batteries. The switch operator 42 is placed in the audio position (A); and the level control 41, which preferably includes an ON/OFF switch (not shown), is turned on. In order to test the operation of the detector 1 and to determine the relative condition of the batteries, the level control knob 41 is adjusted to about one-third scale; and the operator of the detector 1 holds his fingers in front of the microphone enclosure 38 and snaps them. A deflection of the needle of the meter 8 and a snap sound from the speaker 10 indicates that the detector 1 is in working order. The alarm arrangement 14 may be tested in a similar manner with the switch operator 42 in the "T" position. A piercing tone from the speaker 10 indicates proper operation.

In scanning a gas filled cable or other equipment (not shown) for problems generating ultrasonic noise, it is recommended that the detector 1 be first placed in the tone mode and the level control knob adjusted to between one-third and one-half of the scale. The detector 1 is aimed at the cable and its length is scanned, preferably from one side thereof and then from the other side. If the tone is triggered, indicating the presence of a gas leak, the position should be noted for closer inspection, as by rescanning with the detector 1 in the tone mode and finally in the audio mode. When the area of the leak has been precisely determined, repairs can be made.

While certain forms of the present invention have been described and illustrated, it is not to be limited thereto except insofar as such limitations are included in the following claims.

I claim:

1. In a device for detecting ultrasonic noise including a microphone responsive to ultrasonic frequencies, ultrasonic amplifier means connected to said microphone and including filter means responsive to a selected range of ultrasonic frequencies, audio frequency signal means providing an audio frequency envelope signal having characteristics of the ultrasonic noise received, an audio power amplifier connected to said audio frequency signal means, and speaker means connected to said audio power amplifier to convert the amplified audio frequency signal to sound, the improvement comprising:
   (a) level detector means operatively connected to said audio frequency signal means and operative to provide a control signal having a level proportional to the amplitude of said audio frequency envelope signal; and
   (b) alarm means connected to said audio power amplifier and said level detector means and operable upon said control signal exceeding a selected level and in cooperation with said audio power amplifier to trigger an alarm signal and emit an audible indication of the detection of said ultrasonic noise.

2. The device set forth in claim 1 wherein:
   (a) said alarm means is an audio frequency oscillator; and including:
   (b) feedback network means connected between an output of said audio power amplifier and an input thereof; and
   (c) said level detector means being connected to said feedback network means and, upon said control signal exceeding said selected level, causing said audio power amplifier to oscillate at an audio frequency, thereby providing said alarm signal.

3. The device set forth in claim 2 including:
   (a) limiting means connected in said feedback network means to limit the amplitude of said alarm signal.

4. The device set forth in claim 3 wherein said limiting means includes:
   (a) a pair of antiparallel diodes shunt connected in said feedback network means.

5. The device set forth in claim 2 wherein said feedback network means includes:
   (a) a plurality of filter sections defining a phase shift network and in combination with said audio power amplifier defining a phase shift oscillator.

6. The device set forth in claim 2 including:
   (a) switch means connected among an input of said audio power amplifier, said audio frequency signal means, and said feedback network means; and
   (b) said switch means being selectively operable to connect said audio power amplifier input either to said audio frequency signal means or to said feedback network means.

7. The device set forth in claim 1 including:
   (a) a level control operatively connected between said audio frequency signal means and said level detector means and operable to vary the level of said audio frequency envelope signal for which said alarm signal is triggered.

8. The device set forth in claim 1 wherein said audio frequency signal means includes:
   (a) an envelope detector providing said audio frequency envelope signal and having an instantaneous amplitude proportional to the instantaneous amplitude of said ultrasonic noise detected;
   (b) an audio frequency amplifier to increase the amplitude of said envelope signal; and
   (c) audio frequency filter means responsive to a selected range of audio frequencies.

9. The device set forth in claim 1 including:
   (a) a substantially pistol shaped housing; and
   (b) a directional enclosure for said ultrasonic microphone.

10. A device for detecting ultrasonic noise comprising:
    (a) a microphone responsive to sounds of ultrasonic frequencies;
    (b) ultrasonic amplifier means connected to said microphone and including ultrasonic filter means responsive to a selected range of ultrasonic frequencies, said ultrasonic amplifier means and filter means providing an ultrasonic frequency electrical signal having the time varying amplitude envelope of the ultrasonic noise detected;
    (c) envelope detector means connected to said ultrasonic amplifier means to detect said amplitude envelope;
    (d) audio frequency filter means operatively connected to said envelope detector means and responsive to a selected range of audio frequencies, said audio frequency filter means providing an audio frequency envelope signal;
    (e) level control means connected to said audio frequency filter means and operable to adjust the level of said audio frequency envelope signal;
    (f) an audio power amplifier operatively connected to said level control means;
    (g) speaker means connected to said audio power amplifier and converting said audio frequency envelope signal to sound;
    (h) level detector means operatively connected to said level control means and operative to provide a control signal proportional to the level of said audio frequency envelope signal; and
    (i) alarm means connected to said audio power amplifier and said level detector means and operable upon said control signal exceeding a selected level and in cooperation with said audio power amplifier to trigger an alarm signal and emit an audible indication of the detection of said ultrasonic noise.

11. The device set forth in claim 10 wherein:
    (a) said alarm means is an audio frequency oscillator; and including:
    (b) feedback network means connected between an output of said audio power amplifier and an input thereof; and
    (c) said level detector means being connected to said feedback network means and, upon said control signal exceeding a selected level, causing said audio power amplifier to oscillate at an audio frequency thereby providing an alarm signal.

12. The device set forth in claim 11 wherein said feedback network means includes:
    (a) a plurality of filter sections defining a phase shift network and in combination with said audio power amplifier defining a phase shift oscillator.

13. The device set forth in claim 11 including:
    (a) switch means connected among an input of said audio power amplifier, said level control means, and said feedback network means; and (b) said switch means being selectively operable to connect said audio power amplifier input either to said level control means or to said feedback network means.

14. The device set forth in claim 10 including:
(a) a substantially pistol shaped housing; and
(b) a directional enclosure for said ultrasonic microphone.

* * * * *